United States Patent [19]

Gurzynski

[11] Patent Number: 4,684,030

[45] Date of Patent: Aug. 4, 1987

[54] DISPLAY RACK ASSEMBLY

[75] Inventor: Richard M. Gurzynski, Riverside, Ill.

[73] Assignee: Nieman Design Systems Inc., Mount Prospect, Ill.

[21] Appl. No.: 858,026

[22] Filed: May 1, 1986

[51] Int. Cl.⁴ ............................................... A47F 5/08
[52] U.S. Cl. .......................................... 211/88; 211/40
[58] Field of Search ...................... 211/40, 41, 88, 50, 211/55, 56, 58, 90

[56] References Cited

U.S. PATENT DOCUMENTS

| 3,515,283 | 6/1970 | Poteat | 211/55 |
| 4,573,588 | 3/1986 | Cohen | 211/41 |
| 4,584,950 | 4/1986 | Adams et al. | 211/41 |

Primary Examiner—Robert W. Gibson, Jr.
Attorney, Agent, or Firm—Ann W. Speckman; Thomas W. Speckman

[57] ABSTRACT

A modular display rack assembly having a plurality of aligned interlocking vertical panels with a plurality of shelf brackets for supporting display articles attached to each vertical panel is provided. The vertical panels are mounted at an angle with respect to the support structure to provide increased display capacity and improved visibility of the displayed articles. The shelf brackets may be adjustably and removably attached to vertical panels and the modular components may be sized for display of a wide variety of articles.

23 Claims, 8 Drawing Figures

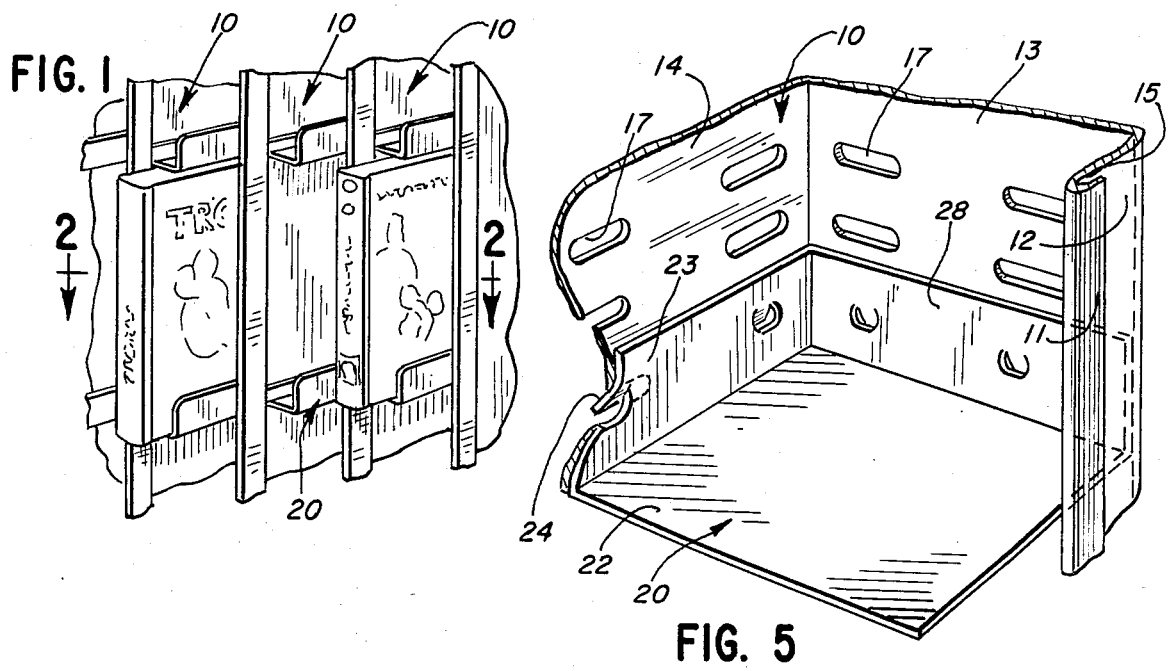
FIG. 1
FIG. 5
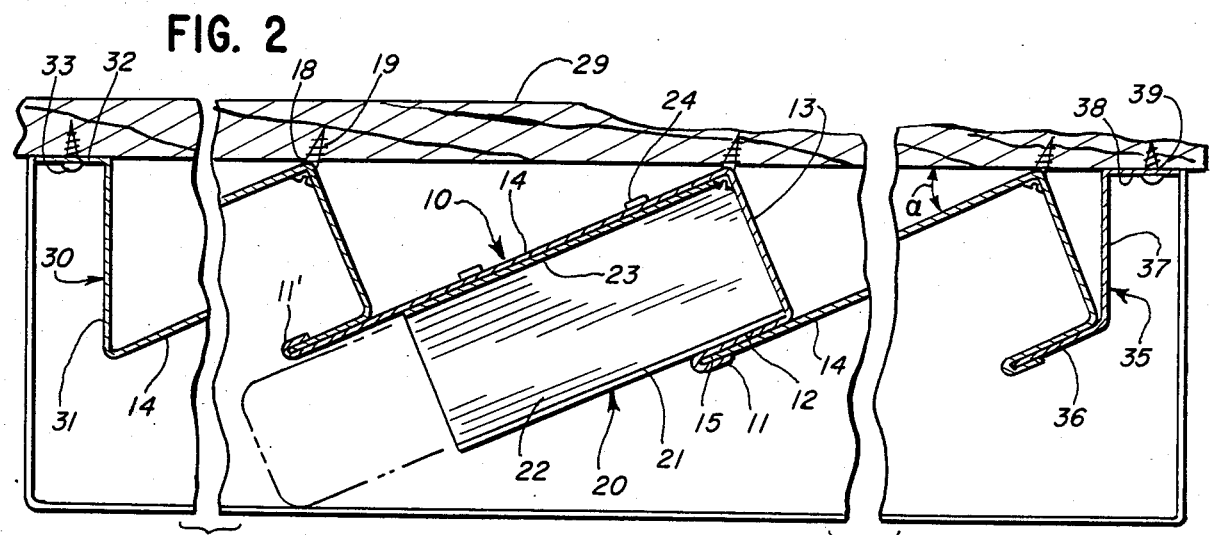
FIG. 2
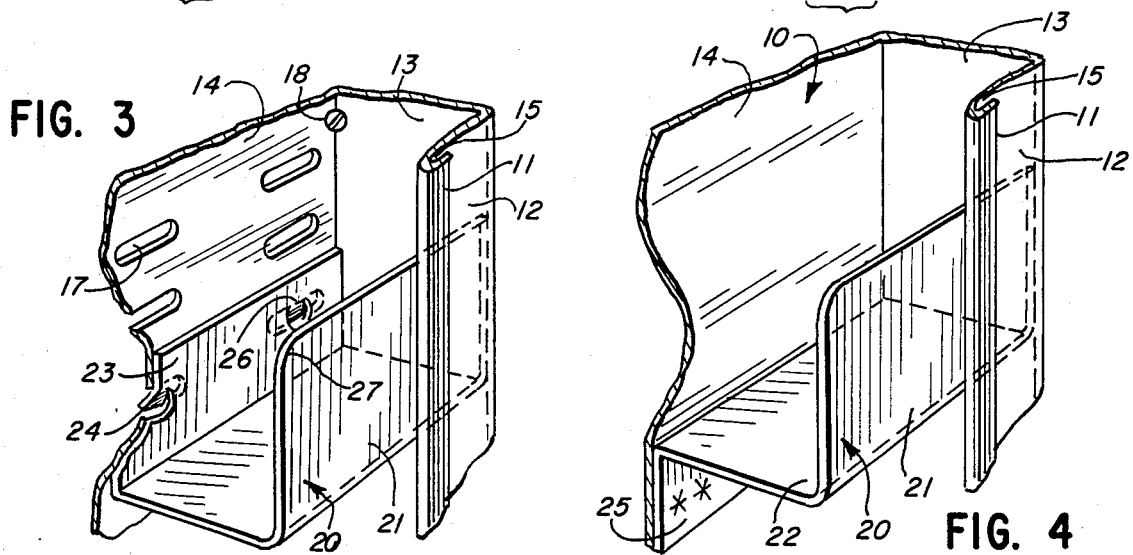
FIG. 3
FIG. 4

DISPLAY RACK ASSEMBLY

BACKGROUND OF THE INVENTION

1. Field of the Invention

The present invention relates to a modular display rack assembly comprising a plurality of interlocking vertical panels with a plurality of shelf brackets attached to each vertical panel. The vertical panels are assembled at an angle with respect to the mounting surface rather than flat against the mounting surface to provide increased display capability per unit surface area in the available display space. The display rack assembly of the present invention is especially suitable for use as a videocassette display rack, and may also be used for displaying books, magazines, tape cassettes, record albums, greeting cards, and other retail articles such as clothing, games, groceries, and the like. The modular display rack assembly may be mounted on a wall, on stationary or movable free standing support structures or partitions, on rotatable display islands, and the like.

2. Description of the Prior Art

Many types of display structures are known for displaying goods for consumer sale or rental such as videocassettes, tape cassettes, books, magazines, record albums, and the like. Books are typically displayed in horizontal rows of shelves, with either the cover of the book or the spine of the book displayed for viewing. Display of the cover of the book is more effective since it is more eye-catching, but it also requires more shelf space than alignment of books to display only the spine. Traditional bookshelves may be used for displaying books only by their spines, while displaying books by their covers requires upstanding rear supports which are substantially perpendicular to the plane of the floor, or which may be angled slightly with respect to the plane of the floor to enhance viewing or display stability. In many displays of books on horizontal shelves, different books are oriented in different directions to provide an interesting and attractive display which also efficiently utilizes the available display space. Magazines are similarly displayed to show the cover, and arranged on shelves extending from solid rear upright supports. In this type of magazine display, the upright support is typically angled slightly from the vertical to provide greater stability for the displayed magazines and to facilitate viewing of the magazine covers, particularly in below counter-height displays. Videocassettes are displayed in a variety of fashions, and are typically simply set edge-to-edge on horizontal shelves extending from an upright support structure. Display of articles edge-to-edge showing the front cover of each individual article is visually effective, but it generally requires a great deal of display space, particularly if conventional shelving is used. For this reason, alternatives have been sought to provide increased display capacity in a limited amount of display surface area space.

To increase the display capacity in a limited amount of space, several display alternatives have been provided. For example, display panels are known which are hinged to a wall or a free standing support structure so that both sides of the panel may be viewed simply by pivoting the panel with respect to the wall, and several panels may be arranged adjacent to one another along a wall or on a separate support structure. Each display panel provides a flat display area which is suitable for displaying art prints, posters, and the like. Revolving display islands are commonly used to display hardware, notions, greeting cards, and other relatively lightweight retail articles.

Display rack assemblies with shelving which is angled in some way with respect to the supporting wall has been proposed, and is highly desirable for display systems, since it provides efficient space utilization and enhances visibility of the display article. Use of specialized angled shelving also permits display of the spine of a book or the title side of a videocassette box when viewed from one direction, and display of at least a portion of the front cover of a book, videocassette, box or the like when viewed from another direction. For example, U.S. Pat. No. 3,138,261 discloses a display shelving system designed for displaying individual carpet samples. The display rack comprises a series of panels aligned parallel to one another and at an angle with respect to the wall or other support structure. The panels are connected to one another and the wall by bolts at regular intervals, and horizontal spacers extend between adjacent panels to separate the panels and to support individual samples. U.S. Pat. No. 3,198,340 teaches a display rack comprising a front rail and a plurality of risers regularly spaced with respect thereto. The front rail and risers have cleats, or supports, whereby adjacent risers interlock to form a display rack having terraced shelves. U.S. Pat. No. 4,307,809 teaches a tape cassette storage rack wherein cassettes are arranged edge-to-edge on a series of aligned shelves. The tapes are preferably stored at an angle to the vertical to provide better access to and visibility of the individual tape cassettes. U.S. Pat. No. 3,661,271 teaches a plurality of merchandise display trays which interlock with upright supports and with one another by means of integral hangers and/or clips. U.S. Pat. No. 3,791,651 teaches a playing card holder having a lip which may be securely retained in a groove, thereby locking adjacent plates.

From a practical standpoint, modular display rack assemblies comprising interlocking modular units which may be assembled in accordance with the user's display requirements and available space limitations provide substantial advantages. Also, display assemblies which are angular with respect to the supporting structure are desirable to enhance display capacity and improve visibility of individually displayed articles.

SUMMARY OF THE INVENTION

It is an object of the present invention to provide a display rack assembly having increased display capacity per unit surface area.

It is another object of the present invention to provide a display rack assembly which is completely modular and may be quickly and conveniently assembled, disassembled and rearranged without requiring any special tools or skilled labor.

It is yet another object of the present invention to provide a modular display rack assembly which is adaptable for displaying different types of retail goods for sale or rental, such as videocassettes, tape cassettes, books, magazines, record albums, greeting cards, clothing, games, and the like.

It is yet another objective of the present invention to provide a display rack assembly affording improved visibility of displayed items by means of angled display of individual articles.

It is still another objective of the present invention to provide a shelf rack assembly which facilitates viewing of two sides of the displayed article.

The display rack assembly of the present invention comprises a plurality of interlocking aligned vertical panels with a plurality of brackets forming shelves attached at intervals along the vertical panels. Each vertical panel comprises a planar rear wall, a side wall extending substantially perpendicular to the rear wall, and a front wall substantially parallel to the rear wall but extending for only a portion of the length of the rear wall, the front and/or rear wall having attachment means for interlocking with adjacent vertical panels. The attachment means preferably comprises a lip forming a groove at the terminal end of the front wall, the groove sized to engage the terminal end of an adjacent panel rear wall. Conversely, attachment means such as a groove may be provided at the terminal end of the rear wall, the groove sized to engage the terminal end of an adjacent panel front wall. In this way, adjacent vertical panels interlock with one another. In a preferred embodiment, each vertical panel is formed by bending a single sheet of metallic material to form the panel back wall, side and front walls and the attachment means at the terminal end of the panel back or front wall.

Individual shelf brackets are attached at intervals along each vertical panel. The number, spacing and dimensions of shelf brackets arranged along vertical panels depends, of course, upon the size of the articles to be displayed. Each shelf bracket has a bracket bottom wall and at least two walls extending in a plane substantially perpendicular to the bracket bottom wall. Each shelf bracket is mounted to a vertical panel at least along the panel rear wall and the bracket bottom wall extends for approximately the width of the vertical panel side wall. An upstanding bracket front wall may be provided abutting the vertical panel front wall. In one embodiment, the shelf brackets are permanently mounted on vertical panels by welding a rear shelf bracket flange to the panel rear wall. In this embodiment, the rear shelf bracket flange preferably extends downwardly at a substantially right angle from the shelf bracket wall. In a preferred embodiment, a shelf bracket rear wall and shelf bracket front wall extend upwardly to form a generally U-shaped shelf bracket, and the shelf bracket rear wall is provided with tabs adapted for insertion into slots in the vertical panel rear wall to provide adjustable and removable attachment of the shelf brackets to the vertical panels. According to this embodiment, a plurality of slots are provided in the vertical panel rear walls to provide adjustable mounting and positioning of the shelf bracket. For certain applications, each shelf bracket may also have a shelf bracket side wall provided with tabs for insertion into slots in the vertical panel side wall for additional support of the shelf bracket.

The vertical panels according to the present invention are assembled by aligning a plurality of vertical panels and interlocking adjacent vertical panels, for example by sliding the terminal vertical edge of a vertical panel rear wall into the groove formed between the adjacent vertical panel front wall and lip. The vertical panels may be assembled on a framework support structure or may be fastened directly to a wall, or the like. The vertical panels are preferably fastened to the supporting structure at the intersection of the panel rear wall with the panel side wall. Vertical panels are aligned at an angle so that the vertical panel rear walls form an acute angle with respect to the supporting wall or the plane of the support structure. Each vertical panel is preferably provided with at least two bores at the intersection of the panel rear and side walls for attachment of each vertical panel to the supporting structure by fastening means such as screws, clip fasteners, and the like. Other fastening means may, of course, be used and may be preferred for particular applications. The vertical panels may be fastened to a supporting structure, such as plywood, which is mounted on a supporting framework such as a display island or other free-standing unit, or the vertical panels may be attached directly to a supporting wall or to furring strips or the like fastened to a supporting wall, or the vertical panels may be mounted directly on a framework structure. The angled orientation of the vertical panel rear walls with respect to the supporting structure provides increased display capacity per unit surface area and also provides visual display of two sides of a display box or package rather than a single side as with conventional shelving displays.

An assembly panel starter is preferably provided for each row of interlocking vertical panels. The assembly panel starter is identical in configuration to the vertical panels, with the addition of an end wall and fastening flange for attachment of the assembly starter panel to the supporting wall. Likewise, an assembly finisher panel is preferably provided for each row of interlocking vertical panels, the finisher panel interlocking with a vertical panel and providing a fastening flange for attachment of the finisher panel to the supporting wall or structure. A base finishing unit may also be provided for installation underneath the aligned vertical panels, preferably between the vertical panels and the floor, or to divide the display assembly into tiers. The base finishing unit preferably comprises a hollow, generally rectangular unit with an attachment flange for fastening the base finishing unit to the supporting wall. The open ends of the base finishing unit are preferably covered by base unit end caps to provide a smooth, attractive finish to the unit and to control or prevent access to the interior of the base finishing unit. Electrical outlets and the like may be provided in the base finishing unit.

The vertical panels and shelf brackets of the present invention may be provided in various sizes and configurations for economical and attractive display of a variety of articles. One embodiment of the display rack assembly is particularly adapted for displaying videocassettes for rental or for sale. Videocassettes are widely available in two different sizes, commonly known as beta and VHS videocassettes. The display rack assembly of the present invention, due to the angular orientation of the aligned vertical panels with respect to the supporting structure, provides display of the title along with the pictorial or graphic representation on the front face of the box when viewed from one direction, and viewing of the title on the narrow side wall of the box from another direction. The depth of the shelves and the dimensions of the vertical panels may be adjusted to provide display of a single article on each shelf bracket, or to accommodate multiple articles or copies on a single shelf bracket. Likewise, articles such as tape cassettes, paperback books, hard-cover books, magazines, record albums, and the like may be economically and attractively displayed in the shelf rack assembly according to the present invention. The display rack assembly of the present invention may also be adapted for displaying other retail articles such as clothing, which is preferably separated by size, style and/or color. The shelf brackets according to this embodiment would be sized to support the desired article of clothing and multiple articles of the same style, size and/or color could be stacked on a single shelf bracket. Individual shelf brackets would preferably be provided with an upstanding front wall bearing a label identifying the articles stacked thereon. Similarly, the display rack assembly of the present invention could be dimensioned for display of grocery items, bottles, games, hardware and other articles for retail sale or rental, and the display rack assembly may be provided projections for hanging or otherwise supporting articles in addition to shelf bracket supports.

The modular components of the display rack assembly of the present invention may be sized and assembled in a variety of ways to accommodate numerous display requirements. Available display space is efficiently utilized by providing modular vertical panels of the appropriate height, and interlocking the required number of adjacent vertical panels to provide a display assembly of the desired dimensions. According to a preferred embodiment, modular vertical panels may be assembled to form a circular island-type display unit.

The modular components preferably comprise a relatively rigid material which is self-supporting, and yet which is flexible enough to form modular components of one-piece construction by bending.

BRIEF DESCRIPTION OF THE DRAWINGS

The above mentioned and other features of the present invention, and the manner of obtaining them, will become apparent and the invention will be best understood by reference to the following description of preferred embodiments read in conjunction with the accompanying drawings, in which:

FIG. 1 shows a perspective view of the shelf rack assembly of the present invention displaying videocassettes;

FIG. 2 is a cross-sectional view of the shelf rack assemely through line 2—2 of FIG. 1;

FIG. 3 is a perspective view showing one embodiment of an adjustable and removable shelf bracket;

FIG. 4 is a perspective view showing another embodiment of a shelf bracket;

FIG. 5 is a perspective view showing yet another embodiment of a shelf bracket;

DESCRIPTION OF PREFERRED EMBODIMENTS

Figure 6:
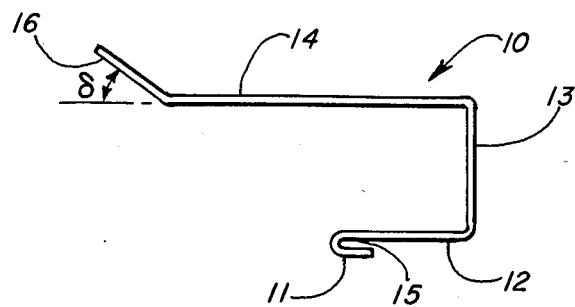
FIG. 6 is a top view of one embodiment of a vertical panel for use in a circular display.

As shown in FIG. 1, the modular display rack assembly of the present invention comprises a plurality of interlocking, aligned vertical panels 10 with shelf brackets 20 provided at intervals along the vertical height of each vertical panel 10. FIG. 1 shows an embodiment which is particularly adapted for displaying videocassettes. According to this embodiment, beta and/or VHS videocassettes may be displayed, depending upon the spacing of shelf brackets on the vertical panels. Likewise, video cassettes may be displayed singly, or multiple copies may be arranged on a single shelf bracket by varying the dimensions of the modular components of the display rack assembly.

As shown more clearly in FIG. 2, each modular vertical panel 10 comprises panel rear wall 14, panel side wall 13 extending from one vertical edge of panel rear wall 14 and substantially perpendicular to panel rear wall 14, panel front wall 12 extending from one vertical edge of panel side wall 13, and substantially perpendicular to panel side wall 13 and attachment means for interlocking adjacent vertical panels, such as panel lip 11 formed at the terminal vertical edge of panel front wall 12. Attachment means may alternatively be formed by panel lip 11' at the terminal vertical edge of panel rear wall 14. Adjacent vertical panels may be joined to one another by attachment means such as rivets, screws, and other fasteners.

The dimensions of vertical panel 10 may be varied to accommodate specific display requirements for different articles. Panel rear wall 14 is preferably about 50 to about 100 percent the length of the article to be displayed. For example, as shown in FIG. 2, in one embodiment for displaying videocassettes, panel rear wall 14 extends for approximately 90 percent the width of the videocassette shown in dashed lines. Panel side wall 13 preferably corresponds approximately to the width of the article or plurality of articles to be displayed. For example, videocassettes for rental may be displayed individually or multiple copies may be displayed on a single shelf bracket, and panel side wall 13 is dimensioned according to display requirements. Books and other retail articles are typically displayed in multiple copies and panel side wall 13 corresponds approximately to the depth of several books or articles. Panel front wall 12 preferably extends for less than about 40 percent the length of panel rear wall 14. Attachment means, such as panel lip 11 is preferably integral with panel front wall 12 or panel rear wall 14, and may be formed by bending the terminal vertical edge of panel front wall 12 or rear wall 14 to form lip 11 substantially parallel to front wall 12. Groove 15 corresponds approximately to the thickness of panel rear wall 14 or front wall 12, so that adjacent vertical panels 10 interlock with one another simply by sliding the terminal vertical edge of one vertical panel into groove 15 of the adjacent vertical panel. Bores 18 may be provided at the intersection of panel rear wall 14 with panel side wall 13 for attachment of vertical panels 10 to supporting structure 29 with fastening means 19, such as screws or retaining clips. For most applications, two points of attachment, one near the top and one near the bottom of vertical panels 10, provide adequate support, but additional bores 18 and fastening means 19 may be provided if required.

As shown in FIG. 2, vertical panels 10 are aligned and fastened to supporting structure 29 with the plane of panel rear walls 14 forming an acute angle $\alpha$ with respect to the plane of supporting structure 29. Each panel rear wall 14 in an aligned row of vertical panels 10 forms substantially the same acute angle $\alpha$ with supporting structure 29. Angle $\alpha$ formed between panel rear walls 14 and supporting structure 29 is preferably from about 10° to about 60°, depending upon the display application and the required display capacity. Angles $\alpha$ of from about 20° to about 45° are especially preferred. Arrangement of vertical panels 10 in this fashion provides increased display capacity per unit surface area, and also effectively displays two surfaces of the displayed article.

Assembly panel starter 30 and assembly panel finisher 35 are preferably provided, one on either end of a row of vertical panels 10 comprising a display rack assembly unit. Assembly panel starter 30 is a vertical panel 10 additionally comprising starter exterior side wall 31 extending substantially perpendicular to supporting structure 29 when panel starter 30 is installed, and starter fastening flange 32 abutting supporting structure 29 and having bores 33 to fasten assembly panel starter 30 to supporting structure 29 at one edge of a display rack assembly unit by suitable fastening means. Assembly panel finisher 35 preferably comprises a separate component, as shown in FIG. 3, which interlocks with the vertical panel 10 at the opposite vertical edge of a display rack assembly unit from assembly panel starter 30. Assembly panel finisher 35 preferably comprises angled front wall 36, finisher exterior side wall 37 extending substantially perpendicular to supporting structure 29 when panel finisher 35 is installed, and finisher fastening flange 38 abutting supporting structure 29 and having bores 39 for fastening assembly panel finisher 35 to supporting structure 29 by suitable fastening means.

Embodiments of shelf brackets 20 suitable for use in the display rack assembly of the present invention are shown in detail in FIGS. 3, 4 and 5. Shelf bracket 20, as shown in FIG. 3, comprises bracket front wall 21 and bracket rear wall 23 extending substantially perpendicularly from bracket bottom wall 22. In the embodiment shown in FIG. 3, shelf bracket 20 is generally U-shaped and display articles are conveniently retained simply by sliding onto shelf bracket 20. Exterior corner 27 of shelf bracket 20 may be rounded for safety purposes. Bracket rear wall 23 is provided with tabs 24 which extend slightly rearwardly from the plane of bracket rear wall 23. Tabs 24 may be provided simply by punching a partially spherical or polygonal section in bracket rear wall 23 leaving bend line 26 along the upper portion of punched tab 24. At least two tabs 24 are generally provided for each shelf bracket 20. Vertical panels 10 may be provided with a plurality of slots 17 in panel rear wall 14 in which tabs 24 slidably engage to anchor shelf brackets 20 as shown in FIG. 3. A plurality of slots 17 may be provided along the vertical height of panel rear wall 14 of vertical panel 10 so that shelf brackets 20 may be attached at different locations along vertical panels 10, and may be moved and adjusted to satisfy different display requirements. This embodiment is particularly suitable for displaying videocassettes, since shelf brackets 20 may be adjusted for displaying beta videocassettes or VHS videocassettes, or both beta and VHS videocassettes in the same display assembly.

FIG. 4 shows another embodiment of shelf bracket 20 wherein bracket front wall 21 and rear bracket flange 25 are both substantially perpendicular to bracket bottom wall 22, but extend in different directions. Again, tabs may be provided in rear bracket flange 25 for sliding engagement in slots 17 of panel rear wall 14 of vertical panels 10, or other fastening means may be provided. Rear bracket flange 25 of shelf bracket 20 shown in FIG. 4 is permanently fastened to vertical panel 10 by spot welding. Shelf brackets 20 may alternatively be fastened to vertical panels 10 by riveting or similar fastening means.

FIG. 5 shows an embodiment of shelf bracket 20 which is particularly adapted for displaying a plurality of books and the like. In this embodiment, shelf bracket 20 comprises bracket bottom wall 22, with bracket rear wall 23 and bracket side wall 28 extending substantially perpendicularly therefrom. Bracket rear wall 23 and bracket side wall 28 may extend upwardly or downwardly with respect to bracket bottom wall 22 and may be provided with tabs 24 for sliding engagement in slots 17 in panel rear wall 14 and panel side wall 13, respectively. Alternatively, bracket rear wall 23 and bracket side wall 28 may be fastened to panel rear wall 14 and panel side wall 13, respectively, by spot welding or other suitable fastening means.

Figure 7:
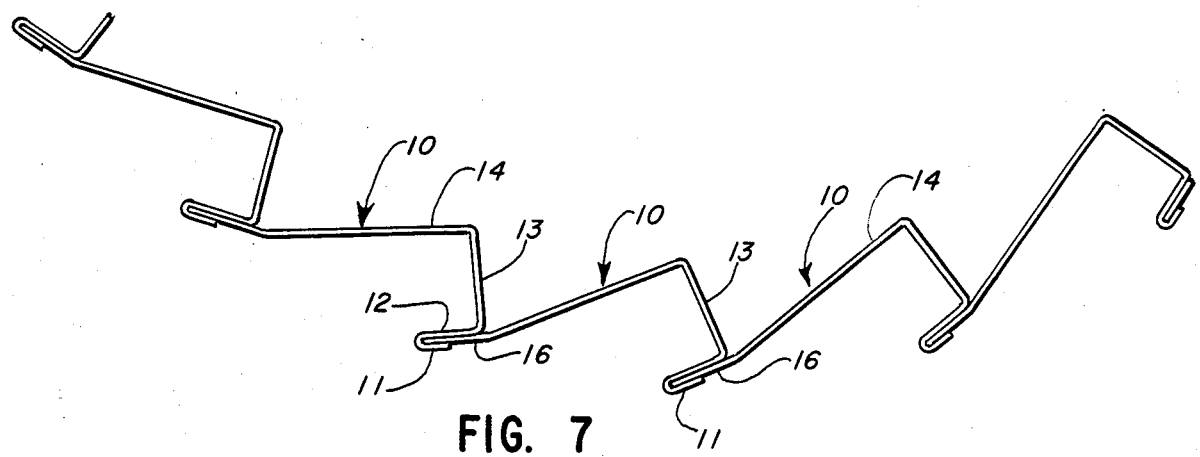
FIG. 7 shows a top view of a plurality of the vertical panels shown in FIG. 6 interlocked with one another.

The dimensions of vertical panels and shelf brackets and the arrangement of shelf brackets comprising the shelf rack assembly of the present invention may be modified to satisfy a wide variety of display requirements. Vertical panels 10 may be provided in a variety of vertical heights to accommodate floor to ceiling display requirements, under-the-counter display requirements, and display assemblies tailored to available display space. Vertical panels 10 may be mounted directly to a supporting structure 29, such as a wall; they may be mounted to furring strips mounted at intervals on a supporting wall structure; they may be mounted to a portable supporting structure, such as on casters; they may be mounted on a revolving island-type display unit; they may be mounted on hinged panels, and the like. According to one preferred embodiment, shown in FIGS. 6 and 7, a circular display unit may be provided by providing vertical panel 10 with angular panel extension 16 directed at angle $\delta$ from panel rear wall 14. Angle $\delta$ is preferably about 10° to about 30°, and may be varied to provide circular display units of different diameters. Vertical panels 10 with angular panel extensions 16 may be interlocked as shown in FIG. 7 to provide a circular display unit. According to this embodiment, assembly panel starters and finishers are unnecessary. Shelf brackets are provided on each vertical panel 10 as described above.

Figure 8:
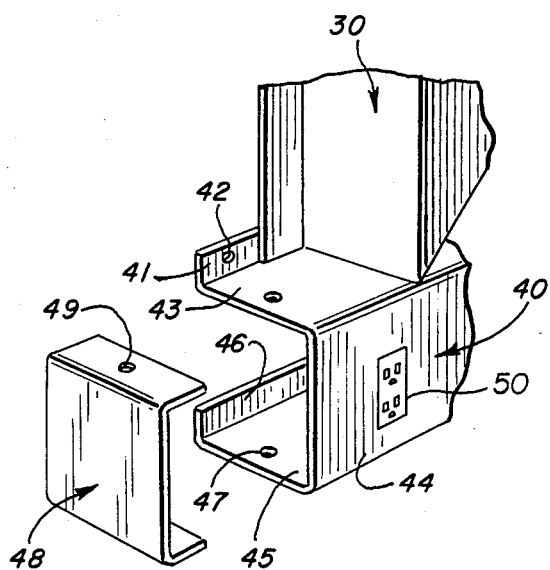
FIG. 8 shows a perspective view of a base finishing unit and end cap.

Base finishing unit 40 may be provided underneath aligned interlocking vertical panels 10 as shown in FIG. 8, as a base support for the shelf rack assembly, to space the shelf rack assembly slightly above floor level, or to divide display assemblies in tiers. Base finishing unit 40 is preferably hollow and generally rectangular. Base finishing unit 40 preferably comprises attachment flange 41 which abuts and fastens to supporting structure 29 by fastening means penetrating attachment bores 42, top support wall 43, front wall 44, bottom wall 45, and upstanding flange 46 abutting supporting structure 29. Base finishing unit 40 is provided with bores 47 at each terminal end matching bores 49 in base unit end caps 48 for fastening base unit end caps 48 to cover the hollow ends of base finishing unit 40. Base finishing unit 40 may be provided with electrical outlets 50, and the like, and provides access to electrical wiring and the like, in the supporting structure behind the shelf rack assembly.

Each modular component of the display rack assembly of this invention, including vertical panels 10, assembly panel starters 30, assembly panel finishers 35, shelf brackets 20 and base finishing unit 40, is preferably of one-piece construction, as shown, but multiple pieces may be assembled to form the modular components, if necessary or desirable for a particular application or material of construction. Metallic materials are preferred, and suitable materials which provide the desired flexibility and rigidity are known to the art. Prepainted steel is an especially preferred material of construction, since display rack assemblies may then be provided in a variety of colors and since sheets of prepainted steel may be cut and bent as required to form the modular components, and no further finishing is required. Rigid plastics which are well known to the art are also suitable.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A modular display rack assembly comprising:
a plurality of vertical panels, each said vertical panel comprising a rear wall, a side wall extending substantially perpendicularly from one vertical edge of said rear wall, a front wall extending from one vertical edge of said side wall substantially parallel to said rear wall, each said vertical panel having attachment means for fastening with an adjacent said vertical panel; and
a plurality of shelf brackets attachable to each said vertical panel, each said shelf bracket comprising a bottom wall with at least two support walls extending substantially perpendicularly therefrom, at least one of said support walls attachable to said vertical panel.

2. A modular display rack assembly according to claim 1 wherein said attachment means comprises said front wall having a lip forming a groove at its terminal end, whereby a terminal vertical edge of said vertical panel rear wall is interlockable in said groove.

3. A modular display rack assembly according to claim 1 wherein said attachment means comprises said panel rear wall having a lip forming a groove at its terminal end, whereby a terminal vertical edge of said vertical panel front wall is interlockable in said groove.

4. A modular display rack assembly according to claim 1 wherein each said interlockable vertical panel is mounted on a supporting structure whereby each said vertical panel rear wall forms an acute angle with respect to said supporting structure.

5. A modular display rack assembly according to claim 4 wherein each said vertical panel is fastened to said supporting structure at an intersection of said panel rear wall with said panel side wall.

6. A modular display rack assembly according to claim 4 wherein said acute angle formed between said vertical panel rear wall and said supporting structure is from about 10° to about 60°.

7. A modular display rack assembly according to claim 6 wherein said acute angle formed between said vertical panel rear wall and said supporting structure is from about 20° to about 45°.

8. A modular display rack assembly according to claim 1 additionally comprising an assembly panel starter similar in configuration to said vertical panels with the addition of a starter panel exterior side wall extending from the other vertical edge of said vertical panel rear wall and a fastening flange extending from said starter panel exterior side wall.

9. A modular display rack assembly according to claim 8 additionally comprising an assembly finisher panel comprising an angled front wall, a terminal vertical edge of said angled front wall interlockable in said attachment means of an adjacent vertical panel, a finisher exterior side wall extending from the other vertical edge of said angled front wall, and a fastening flange extending from said exterior side wall.

10. A modular display rack assembly according to claim 9 additionally comprising a base finishing unit for installation underneath said plurality of aligned interlocking vertical panels, said base finishing unit comprising a generally rectangular structure.

11. A modular display rack assembly according to claim 10 wherein said base finishing unit comprises a hollow, generally rectangular structure provided with bottom unit end caps at each terminal end of said base finishing unit providing a closed exterior structure.

12. A modular display rack assembly according to claim 11 wherein electrical outlets are provided in said base finishing unit.

13. A modular display rack assembly according to claim 9 wherein each modular component, including each said vertical panel, each said shelf bracket, said assembly starter panel and said assembly finisher panel is of one-piece construction.

14. A modular display rack assembly according to claim 1 wherein each said shelf bracket comprises a bracket front wall and a bracket rear wall extending from said bracket bottom wall, said bracket rear wall is provided with tabs extending slightly rearwardly from said bracket rear wall and said vertical panel rear wall is provided with a plurality of slots for engaging said tabs whereby said shelf brackets are adjustably and removably retained on said vertical panels.

15. A modular display rack assembly according to claim 14 wherein each said shelf bracket is generally U-shaped and comprises a bracket front wall and a bracket rear wall extending upwardly from said bracket bottom wall.

16. A modular display rack assembly according to claim 14 wherein each said shelf bracket comprises a bracket front wall extending upwardly from said bracket bottom wall and a bracket rear wall extending downwardly from said bracket bottom wall.

17. A modular display rack assembly according to claim 14 wherein said vertical panel rear wall is provided with a plurality of slots spaced along the vertical height of said vertical panel rear wall and said shelf brackets are adjustably positioned at locations along the vertical height of said vertical panel.

18. A modular display rack assembly according to claim 1 wherein said shelf bracket comprises a bracket front wall extending upwardly from said bracket bottom wall and a bracket rear wall extending downwardly from said bracket bottom wall, and said bracket rear wall is welded to said vertical panel rear wall.

19. A modular display rack assembly according to claim 14 wherein said shelf bracket additionally comprises a bracket side wall extending substantially perpendicularly from said bracket bottom wall, said bracket side wall is provided with tabs extending slightly outwardly from said bracket side wall and said vertical panel side wall is provided with a plurality of slots for engaging said tabs whereby said shelf brackets are adjustably and removably retained on said vertical panels.

20. A modular display rack assembly according to claim 1 wherein said vertical panels additionally comprise an angular panel extension extending at an acute angle from a terminal vertical edge of said panel rear wall, whereby said plurality of interlockable vertical panels forms a circular display unit.

21. A modular diplay rack assembly according to claim 20 wherein said acute angle is about 10° to about 30°.

22. A modular display rack assembly comprising:
a plurality of aligned vertical panels, each said vertical panel comprising a rear wall, a side wall extending substantially perpendicularly from one vertical edge of said rear wall, a front wall extending from one vertical edge of said side wall substantially parallel to said rear wall, each said vertical panel having attachment means interlocking each said vertical panel with an adjacent said vertical panel; and
a plurality of shelf brackets attached to each said vertical panel, each said shelf bracket comprising a bottom wall with at least two support walls extending substantially perpendicularly therefrom, at least one of said support walls attached to said vertical panel.

23. A modular display rack assembly according to claim 22, additionally comprising:
an assembly panel starter interlocked at one terminal vertical edge of said plurality of aligned vertical panels similar in configuration to said vertical panels with the addition of a starter panel exterior side wall extending from the other vertical edge of said vertical panel rear wall and a fastening flange extending from said starter panel exterior side wall; and
an assembly panel finisher at the other terminal vertical edge of said plurality of aligned vertical panels comprising an angled front wall interlocked in said attachment means of an adjacent said vertical panel, a finisher exterior side wall extending from said angled front wall, and a fastening flange extending from said exterior side wall.

* * * * *